United States Patent [19]

Gaggar et al.

[11] Patent Number: 4,857,590
[45] Date of Patent: Aug. 15, 1989

[54] POLYMER BLEND COMPOSITIONS

[75] Inventors: Satish K. Gaggar; James M. Dumler; Thomas B. Cleveland, all of Parkersburg, W. Va.

[73] Assignee: GE Chemicals, Inc., Parkersburg, W. Va.

[21] Appl. No.: 59,178

[22] Filed: Jun. 8, 1987

[51] Int. Cl.$^4$ .................. C08L 35/06; C08L 33/08; C08L 55/02; C08L 71/00

[52] U.S. Cl. .......................... 525/64; 525/80; 525/187; 525/227; 525/942

[58] Field of Search ............ 525/64, 65, 187, 942, 525/208, 80, 227

[56] References Cited

U.S. PATENT DOCUMENTS

| | | | |
|---|---|---|---|
| 2,857,360 | 10/1958 | Feuer | 260/45.5 |
| 2,964,492 | 12/1960 | Murdock et al. | 525/119 |
| 3,062,686 | 11/1962 | Graulich et al. | 428/360 |
| 3,087,843 | 4/1963 | Pritchard | 149/19.6 |
| 3,340,224 | 9/1967 | Sherman et al. | 523/40 |
| 3,351,517 | 11/1967 | Willis | 161/184 |
| 3,425,981 | 2/1969 | Puletti et al. | 524/586 |
| 3,445,544 | 5/1969 | Schmitt | 524/64 |
| 3,450,794 | 6/1969 | Ebneth et al. | 260/876 |
| 3,639,651 | 2/1972 | Komuro et al. | 260/23.7 M |
| 3,657,393 | 4/1972 | Komuro et al. | 260/887 |
| 3,674,893 | 7/1972 | Nowak et al. | 260/836 |
| 3,864,426 | 2/1975 | Salensky | 260/837 R |
| 3,923,922 | 12/1975 | Grant | 260/25 EP |
| 4,048,261 | 9/1977 | Starmer | 260/888 |
| 4,070,522 | 1/1978 | Ogasa et al. | 428/336 |
| 4,112,020 | 9/1978 | Callan | 525/64 |
| 4,117,034 | 9/1978 | Steffancin | 525/64 |
| 4,315,081 | 2/1982 | Kobayashi et al. | 525/64 |
| 4,408,013 | 10/1983 | Barnhouse | 525/187 |
| 4,543,390 | 9/1985 | Tanaka et al. | 525/63 |
| 4,588,773 | 5/1986 | Federl et al. | 525/64 |

FOREIGN PATENT DOCUMENTS

| | | |
|---|---|---|
| 103296 | 3/1984 | European Pat. Off. |
| 201097 | 12/1986 | European Pat. Off. |
| 1250926 | 12/1960 | France |

Primary Examiner—Allan M. Lieberman
Attorney, Agent, or Firm—Lowe, Price, LeBlanc, Becker & Shur

[57] ABSTRACT

Polymer blend compositions exhibiting good antistatic properties and ductility comprise a styrenic polymer, an epihalohydrin copolymer and an acrylate polymer present in an amount sufficient to effect compatability of the styrenic polymer and the epihalohydrin polymer as compared with a blend of the styrenic polymer and the epihalohydrin copolymer not including the acrylate polymer. In a more specific embodiment the polymer blend compositions comprise from about 40 to about 96 percent by weight of a styrenic polymer, from about 2 to about 50 percent by weight of an epihalohydrin copolymer, and from about 2 to about 50 percent by weight of an acrylate polymer.

17 Claims, No Drawings

POLYMER BLEND COMPOSITIONS

FIELD OF THE INVENTION

The present invention relates to polymer blend compositions exhibiting good antistatic properties and improved ductility. More particularly, the present invention relates to polymer blend compositions comprising a styrenic polymer, an epihalohydrin copolymer and an acrylate polymer.

BACKGROUND OF THE INVENTION

Compositions containing styrenic polymers such as ABS are widely used owing to the high impact strength, tensile strength and hardness and the thermoplastic properties of styrenic polymers. However, many compositions containing styrenic polymers exhibit relatively slow electrostatic charge dissipation rates which make the compositions unacceptable for uses wherein rapid dissipation of static electrical charges is required.

Various means have been developed for reducing electrostatic charge retention in polymer compositions. According to one method, an article molded from a polymer composition may be coated with an antistatic film coating material. According to another method, static charge retention in a polymer composition may be reduced by incorporating a material having antistatic properties into the polymer composition For example, the Puletti et al U.S. Pat. No. 3,425,981 discloses polymer compositions including homopolymers and copolymers of ethylene oxide to reduce static charge retention and the Ebneth et al U.S. Pat. No. 3,450,794 discloses polymer compositions including polypropylene glycol. The Tanaka et al U.S. Pat. No. 4,543,390 discloses antistatic polymer compositions including super fine particle polymers comprising graft copolymers of polyalkylene oxide and at least one vinyl monomer.

The Federl et al U.S. Pat. No. 4,588,773 discloses an improved antistatic polymer composition comprising less than 80% by weight of an ABS graft copolymer and more than 20% by weight of an epihalohydrin copolymer. The polymer compositions disclosed by Federl et al exhibit charged decay rates from 5,000 volts to 0 volts of less than about 2 seconds. The ability of these compositions to rapidly dissipate static electrical charge makes these polymer compositions particularly advantageous for use in many applications. However, Applicants have discovered that the delamination tendencies and low tensile elongation properties of the polymer compositions disclosed by Federl et al are somewhat inferior to other polymer compositions containing ABS polymers, therefore limiting the use of these compositions in various applications.

It is therefore an object of the present invention to provide polymer blend compositions which exhibit good antistatic properties with reduced delamination and improved ductility as indicated by tensile elongation. Specifically, it is an object of the present invention to provide polymer blend compositions which exhibit rapid dissipation of static electrical charges and improved ductility and reduced delamination tendencies exhibited by increased tensile elongation before breaking.

SUMMARY OF THE INVENTION

These and additional objects are provided by the polymer blend compositions of the present invention which comprise a styrenic polymer, an epihalohydrin copolymer and an acrylate polymer The acrylate polymer is included in the polymer blend compositions in an amount sufficient to increase the compatability of the epihalohydrin copolymer and the styrenic polymer as compared with a blend of the styrenic polymer and the epihalohydrin copolymer not including the acrylate polymer. The increase in compatability is evidenced in part by an increase in ductility as demonstrated by tensile elongation. More preferably, the polymer blend compositions according to the present invention which exhibit good antistatic properties and improved ductility comprise from about 40 to about 96% by weight of a styrenic polymer, from about 2 to about 50% by weight of an epihalohydrin copolymer, and from about 2 to about 50% by weight of an acrylate polymer. In a more preferred embodiment, the compositions include from about 55 to about 90 percent by weight of a styrenic polymer, from about 5 to about 25 percent by weight of an epihalohydrin copolymer and from about 5 to about 25 percent by weight of an acrylate polymer.

These and additional advantages of the polymer blend compositions according to the present invention will be more fully understood in view of the following detailed description.

DETAILED DESCRIPTION

The polymer blend compositions of the invention comprise a styrenic polymer, an epihalohydrin copolymer and an acrylate polymer. The acrylate polymer is included in the polymer blend compositions in an amount sufficient to increase the compatability of the epihalohydrin copolymer and the styrenic polymer as compared with a blend of the styrenic polymer and the epihalohydrin copolymer not including the acrylate polymer.

In order that the polymer blend compositions exhibit the high impact strength and hardness and thermoplastic properties generally associated with styrenic polymers, it is preferred that the styrenic polymer is included in the polymer blend compositions of the present invention in an amount of from a bout 40 to about 96% by weight. Additionally, in order to provide the polymer blend compositions of the invention with antistatic properties and the ability to quickly dissipate static electrical charges, it is preferred that the epihalohydrin copolymer is included in an amount of from about 2 to about 50% by weight. Additionally, in order that the polymer blend compositions of the invention exhibit improved ductility, it is preferred that the acrylate polymer be included in the compositions, preferably in an amount of from about 2 to about 50% by weight. In a more preferred embodiment, the polymer blend compositions of the invention include from about 55 to about 90% by weight of the styrenic polymer, from about 5 to about 25% by weight of the epihalohydrin copolymer and from about 5 to about 25% by weight of the acrylate polymer. The amounts of each component included in the polymer blend compositions of the invention are selected to add up to 100 weight percent.

The styrenic polymers which are useful for the purposes of this invention are polymers and copolymers of styrene and include both the rigid resins and the resins commonly designated as high-impact styrenic resins. The high impact resins are generally prepared by the graft polymerization of mixtures of styrene and optionally one ormore additional copolymerizable vinyl monomers in the presence of a rubbery polymeric substrate.

Analogous resins may also be produced by blending a rigid matrix polymer with a grafted rubbery substrate, such as a high rubber graft. Generally, high rubber grafts contain a high percentage of rubbers, for example 30 or more weight percent, preferably 40 or more weight percent, and are known in the art. Comonomers which may be employed in mixtures with styrene for the preparation of rigid styrene copolymers as well as for use as grafting monomers include monomers selected from the group alpha methylstyrene, halostyrenes, vinyl alkyl-benzenes such as vinyl toluene, vinylxylene, butylstyrene and the like, acrylonitrile, methacrylonitrile, the lower alkyl esters of methacrylic acid and mixtures thereof. In the high-impact styrenic resins, the rubbery polymeric substrate will usually comprise from 5 to 80%, preferably from 5 to 50% of the total weight of the graft polymer and will include rubbery polymers selected from the group consisting of polybutadiene, polyisoprene, rubbery styrene-diene copolymers, acrylic rubber, nitrile rubber and olefin rubbers such as EPDM and EPR. Additionally, other styrenic polymers known in the art may be used in the blend compositions of the invention.

Specific examples of graft polymers which may be usefully modified for the purpose of this invention are the acrylonitrile-butadiene-styrene graft polymer resins (ABS), methylmethacrylate-butadiene-acrylonitrile styrene (MABS) resins, styrene-butadiene graft polymer resins (HIPS), and methylmethacrylate-butadiene-styrene resins (MBS). Specific examples of styrene polymers which may be usefully modified for the purpose of this invention include polystyrene and copolymers of styrene such as styrene-acrylonitrile (SAN) copolymers, styrenemethacrylate ester copolymers, styrene-acrylonitrilemaleic anhydride terpolymer resins (SAMA), styrene-maleic anhydride copolymer resins (SMA), similar polymers containing N-phenyl and other substituted maleimides and the like, and mixtures thereof. Additionally, the analogous copolymer resins wherein a portion of the styrene monomer component is replaced with other styrenic monomers such as alpha-methyl-styrene, halogenated styrenes or vinyl toluene may also be used. Blends of styrenic polymers and one or more of polyphenylene ethers, polyvinyl chloride polymers, polyamides, polycarbonates and other polymers generally known in the art for blending with styrenic polymers may also be used. These additional polymers are generally known in the art and are disclosed in *Modern Plastics Encyclopedia,* 1986–1987 McGraw-Hill Inc., New York, New York.

The epihalohydrin copolymer is included in the polymer blend compositions of the present invention in order to provide the compositions with good antistatic properties. The epihalohydrin may be copolymerized with any of a variety of known, copolymerizable monomers which have an oxirane group. Such monomers include glycidyl ethers, monoepoxides of dienes and polyenes, glycidyl esters and alkylene oxides. Examples of such monomers include vinyl glycidyl ether, isopropenyl glycidyl ether, butadiene monoxide, chloroprene monoxide, 3,4-epoxy-1-pentene, glycidyl acrylate, glycidyl methacrylate, 1,2-epoxy-3,3,3-trichloropropane, phenyl glycidyl ether, ethylene oxide, propylene oxide and trichlorobutylene oxide.

Preferably, the monomer is an alkylene oxide such as ethylene oxide, propylene oxide, butylene oxide, 3,4-epoxy- 1-pentene, 1,2-epoxy-3,3,3-trichloropropane, trichlorobutylene oxide and the like. More preferably, the alkylene oxide is ethylene oxide, propylene oxide or mixtures thereof. Ethylene oxide is most preferred.

In a preferred embodiment, the epihalohydrin and the alkylene oxide are copolymerized to form a epihalohydrin rubber prior to combination with the styrenic polymer. Suitable epihalohydrin copolymers are available commercially or may be prepared from known, commercially available monomers using known techniques. Generally, the epihalohydrin copolymer may include about 2% to about 98% by weight epihalohydrin, and about 98% to about 2% by weight of another monomer. More preferably, however, the copolymer includes about 5% to about 50% by weight epihalohydrin and about 95% to about 50% by weight of another monomer, which is preferably an alkylene oxide. In a most preferred embodiment the copolymer comprises from about 10 to about 40 percent by weight of an epihalohydrin and about 90 to about 60 percent by weight of another monomer.

The acrylate polymer which is included in the polymer blend compositions of the present invention to provide the compositions with improved ductility may comprise an acrylate homopolymer or an acrylate copolymer. If an acrylate copolymer is used, it is preferred that the copolymer is formed from greater than 50% by weight acrylate monomer. Preferred acrylate polymers comprise acrylate homopolymers such as polyalkylacrylates and polyalkylmethacrylates and acrylate copolymers containing small (for example, less than 10 wt%) amounts of acrylate comonomer. A particularly preferred acrylate polymer for use in the present invention comprises polymethylmethacrylate.

The blend compositions of the invention may be prepared by combining the styrene polymer, the epihalohydrin polymer and the acrylate polymer in any of the conventional methods known in the art. For example, the polymers may be combined to form the blend compositions by melt mixing the polymer ingredients in a Banbury mixer, extruder or on a mill. Other known additives, such as impact modifiers, pigments, lubricants, stabilizers, fillers, flame retardants, foaming agents and antioxidants may also be included in the polymer blend compositions.

The acrylate polymers disclosed herein for improving the ductility and compatability of blends of styrenic polymers and epihalohydrin copolymers may also be used for improving the ductility and/or compatibility of blends of epihalohydrin copolymers and other thermoplastic polymers, for example, polyphenylene ethers, polyvinyl chlorides, polycarbonates, thermoplastic polyesters, polysulfones and the like.

The following examples are provided in order to illustrate several polymer blend compositions according to the present invention.

EXAMPLE 1

An styrenic polymer was formed by blending 47 parts by weight of a styrene acrylonitrile copolymer (styrene to acrylonitrile weight ratio of 75/25) with 23 parts by weight of a high rubber graft copolymer. To the mixture were added 15 parts by weight of a copolymer comprising epichlorohydrin and ethylene oxide having an approximate weight ratio of 20% epihalohydrin and 80% ethylene oxide, and 15 parts by weight polymethylmethacrylate. The mixture was compounded in a Banbury mixer and then injection molded at 430° F. to evaluate the mechanical and electrostatic dissipative (ESD) properties. Specifically, the surface resistivity, the percent of tensile elongation and the electrostatic dissipative rate from 5 KV to 0 volts at 15 and 50% relative humidity were measured, the results of which are set forth in Table I.

EXAMPLE 2

A composition was prepared as set forth in Example 1 except that a different styrene acrylonitrile copolymer (styrene to acrylonitrile ratio of 72/28) was substituted for the styrene acrylonitrile copolymer of Example 1. The resultant product was subjected to the surface resistivity, percent tensile elongation and electrostatic dissipative rate measurements as set forth in Example 1, the results of which are also set forth in Table I.

EXAMPLE 3

A polymer blend composition according to the present invention was prepared by combining 70 parts by weight of a styrenic polymer comprising a copolymer of acrylonitrile and styrene graft polymerized onto a rubber substrate, 15 parts by weight of the epichlorohydrin copolymer of Example 1 and 15 parts by weight of the polymethylmethacrylate of Example 1. The resultant mixture was compounded in a Banbury mixer and injection molded at 430° F. The resultant product was subjected to surface resistivity, percent tensile elongation and the electrostatic dissipative measurements as set forth in Example 1, the results of which are set forth in Table I.

EXAMPLE 4

A preferred polymer blend composition according to the present invention was prepared by combining 75 parts by weight of a styrenic ABS polymer (52 parts of the styrene-acrylonitrile copolymer from Example 2 and 23 parts of the high rubber substrate from Example 1), 18 parts by weight of the epichlorohydrin copolymer of Example 1, and 7 parts by weight polymethylmethacrylate. The resultant mixture was compounded in a Banbury mixer and injection molded at 430° F. The resultant product was then subjected to the surface resistivity, the percent tensile elongation and the electrostatic dissipative measurements as set forth in Example 1, the results of which are set forth in Table I.

COMPARATIVE EXAMPLE 1

A polymer blend composition was prepared comprising an ABS polymer including 62 parts by weight of the stryene acrylonitrile copolymer of Example 2 blended with 23 parts by weight of a high rubber graft copolymer, and 15 parts by weight of the epichlorohydrin copolymer of Example 2. The mixture was compounded in a Banbury mixer and injection molded at 430° F. The resultant product was subjected to the surface resistivity, the percent tensile elongation and electrostatic dissipative measurements set forth in Example 1, the results of which are set forth in Table I.

TABLE I

| Example | 1 | 2 | 3 | 4 | CE 1 |
|---|---|---|---|---|---|
| Styrenic Polymer (parts by weight) | 70 | 70 | 70 | 75 | 85 |
| Epichlorohydrin copolymer (parts by weight) | 15 | 15 | 15 | 18 | 15 |
| Polymethylmethacrylate (parts by weight) | 15 | 15 | 15 | 7 | — |
| Properties: | | | | | |
| Surface Resistivity | $10^{12}$ | $10^{12}$ | $10^{12}$ | $10^{12}$ | $10^{12}$ |

TABLE I-continued

| Example | 1 | 2 | 3 | 4 | CE 1 |
|---|---|---|---|---|---|
| (ASTM D-257) | | | | | |
| Percent Tensile Elongation (ASTM D-638, 0.2"/min.) | 20–25 | 30–40 | 40–50 | 19 | 2–4 |
| Electrostatic Dissipation (sec.) | | | | | |
| at 50% RH | 1.37 | 1.62 | 1.12 | 0.77 | 2.34 |
| at 15% RH | 9 | 11 | 3 | 1.24 | 5 |
| (Federal Test Method Standard 101B, Method 4046) | | | | | |

These examples demonstrate that the antistatic and electrostatic dissipative properties of the compositions according to the present invention are comparable to or better than those of the Comparative composition which does not include the acrylate polymer. However, as demonstrated by the percent tensile elongation to break measurements, the polymer blend compositions of the present invention exhibit significantly improved ductility. Thus, the polymer blend compositions of the present invention are particularly adapted for use in applications requiring good antistatic or electrostatic dissipative properties and good ductility.

EXAMPLES 5–9

Polymer blend compositions were prepared according to the present invention comprising a high impact polystyrene (HIPS), an epichlorohydrin-ethylene oxide copolymer and polymethylmethacrylate. The amounts of each component included in the compositions of Examples 5–9 are set forth in Table II. These compositions were twin-screw extrusion compounded at 425° F. and injection molded at 430° F. The products were then tested to evaluate their mechanical and electrostatic dissipative properties. Specifically, the products were subjected to tens elongation, yield and modulus measurements and Dynatup ® impact and notched Izod impact measurements. The electrostatic dissipation performance was measured in terms of decay time from 5000 to 0 volts at 11 percent relative humidity. The same ASTM procedures set forth in connection with Examples 1–4 were applied with respect to the products of Examples 5–9. The results of these measurements are set forth in Table II.

COMPARATIVE EXAMPLE 2

A polymer blend composition was prepared including 85 parts by weight of the high impact polystyrene used in Examples 5–9 and 15 parts by weight of the epichlorohydrin-ethylene oxide copolymer used in Examples 5–9. This composition was twin-screw extrusion compounded at 425° F. and injection molded at 430° F. The resultant product was then subjected to the tensile elongation, yield and modulus measurements and the Dynatup ® dart impact and notched Izod impact measurements as described in Examples 5–9. The composition product was also subjected to the electrostatic dissipation performance evaluation as set forth in connection with Examples 5–9. The results of these measurements are also set forth in Table II.

COMPARATIVE EXAMPLE 3

A polymer composition was prepared comprising 100 parts by weight of the high impact polystyrene used in Examples 5–9. This polymer composition was subjected to the molding processing set forth in Examples 5-9 and then subjected to the tensile, impact and electrostatic dissipation performance measurements set forth in Examples 5-9, the results of which are set forth in Table II.

TABLE II

| Example | 5 | 6 | 7 | 8 | 9 | CE 2 | CE 3 |
|---|---|---|---|---|---|---|---|
| Styrenic Polymer (parts by weight) | 80 | 77.5 | 75 | 72.5 | 70 | 85 | 100 |
| Epichlorohydrin copolymer (parts by weight) | 15 | 15 | 15 | 15 | 15 | 15 | — |
| Polymethylmethacrylate (parts by weight) | 5 | 7.5 | 10 | 12.5 | 15 | — | — |
| $\frac{1}{8}'' \times \frac{1}{8}''$ Tensile Percent Elongation | 10 | 17 | 25 | 19 | 50 | 5 | 44 |
| Yield (psi) | 3320 | 3310 | 3360 | 3050 | 2780 | 3250 | 4520 |
| Modulus ($\times 10^5$ psi) | 2.59 | 2.40 | 2.31 | 2.21 | 2.04 | 2.75 | 3.29 |
| $\frac{1}{8}''$ Dynatup ® Dart Impact (ft-lbs) | 12.6 | 12.8 | 16.2 | 15.1 | 15.6 | 4.3 | 11.5 |
| $\frac{1}{8}''$ Notched Izod Impact (ft-lbs/in) | 2.5 | 2.5 | 2.6 | 2.8 | 2.8 | 2.1 | 2.8 |
| Electrostatic Dissipation at 11% RH (sec.) | 17.9 | 32.3 | 30.3 | 37.9 | >60 | 3.4 | None* |

*No electrostatic dissipation properties measurable

Examples 5-9 demonstrate the significant improvement in ductility as represented by percent tensile elongation, dart impact and Izod impact values for polymer blend compositions containing a styrenic polymer, an epichlorohydrin copolymer and polymethylmethacrylate relative to the formulation of Comparative Example 2 which does not include polymethylmethacrylate. Additionally, Examples 5-9, demonstrate the significant electrostatic dissipation properties of the polymer blend compositions of the present invention as compared with the high impact polystyrene control composition of Comparative Example 3 which does not contain either the epichlorohydrin copolymer or polymethylmethacrylate. All of the compositions of Examples 5-9 and Comparative Examples 2 and 3 exhibited a surface resistivity within the range of $10^9$ to $10^{13}$ ohms/square.

EXAMPLE 10

This example demonstrates a polymer blend composition according to the present invention containing a high impact polystyrene, an epichlorohydrin copolymer and polymethylmethacrylate. Specifically, the composition comprised 70 parts by weight of the high impact polystyrene, 15 parts by weight of the epichlorohydrinethylene oxide copolymer as set forth in Example 1, and 10 parts by weight of the polymethylmethacrylate. The composition also included 5 parts by weight of a rubber modifier. The composition was mixed and injection molded to produce products which were then tested to evaluate their mechanical and electrostatic dissipative properties. Specifically, the products were subjected to the tensile elongation, Izod impact and dart impact measurements set forth in the discussion of Examples 5-9 and the electrostatic dissipation measurement also set forth in the discussion of Examples 5-9. The composition products of this example exhibited 32% tensile elongation 3 2 ft-lbs/in notched Izod impact and 14.0 ft-lbs Dynatup ® dart impact. Additionally, the electrostatic dissipation decay time from 5000 to 0 volts at 11% relative humidity was 1.8 seconds. Thus, the composition of this example including a high impact polystyrene with a rubber modifier, a polyepichlorohydrin copolymer and polymethylmethacrylate exhibited both improved ductility and enhanced electrostatic dissipation properties.

The preceding Examples are set forth to illustrate specific embodiments of the invention and are not intended to limit the scope of the compositions and methods of the present invention. Additional embodiments and advantages within the scope of the claimed invention will be apparent to one of ordinary skill in the art.

What is claimed is:

1. A polymer blend composition, comprising:
   (a) from about 40 to about 96 percent by weight of a styrenic polymer comprising a polymer or copolymer of styrene;
   (b) from about 2 to about 50 percent by weight of an epihalohydrin copolymer; and
   (c) from about 2 to about 50 percent by weight of an acrylate polymer selected from the group consisting of acrylate homopolymers and acrylate copolymers formed from greater than 50 percent by weight acrylate monomer, the amounts of each of components (a), (b) and (c) of the blend adding up to 100 weight percent.

2. A polymer blend composition as defined by claim 1, comprising:
   (a) from about 55 to about 90 percent by weight of the styrenic polymer;
   (b) from about 5 to about 25 percent by weight of the epihalohydrin copolymer; and
   (c) from about 5 to about 25 percent by weight of the acrylate polymer.

3. A polymer blend composition as defined by claim 1, wherein the styrenic polymer comprises an ABS graft copolymer.

4. A polymer blend composition as defined by claim 3, wherein the ABS polymer comprises a copolymer of acrylonitrile and a styrene monomer graft polymerized onto a rubber substrate.

5. A polymer blend composition as defined by claim 1, wherein the styrenic polymer comprises a high impact polystyrene.

6. A polymer blend composition as defined by claim 1, wherein the styrenic polymer comprises a polymethylmethacrylate styrene acrylonitrile butadiene graft copolymer.

7. A polymer blend composition as defined by claim 1, wherein the styrenic polymer comprises a blend of a polystyrene and polyphenylene ether.

8. A polymer blend composition as defined by claim 1, wherein the styrenic polymer comprises a high rubber graft polymer and at least one polymer selected from styrene-acrylonitrile-maleic anhydride polymers and styrene-maleic anhydride polymers.

9. A polymer blend composition as defined by claim 1, wherein the epihalohydrin copolymer comprises a copolymer of epihalohydrin and an alkylene oxide.

10. A polymer blend composition as defined by claim 9, wherein the alkylene oxide is selected from the group consisting of ethylene oxide, propylene oxide, and mixtures thereof.

11. A polymer blend composistion as defined by claim 9, wherein the epihalohydrin copolymer comprises a copolymer of epichlorohydrin and ethylene oxide.

12. A polymer blend composition as defined by claim 11, wherein the epihalohydrin copolymer comprises 10–40 weight percent epichlorohydrin and 90–60 weight percent ethylene oxide.

13. A polymer blend composition as defined by claim 1, wherein the acrylate polymer comprises an acrylate homopolymer.

14. A polymer blend composition as defined by claim 13, wherein the acrylate homopolymer is selected from the group consisting of polyalkyl acrylates and polyalkylmethacrylates.

15. A polymer blend composition as defined by claim 14, wherein the acrylate homopolymer comprises polymethylmethacrylate.

16. A polymer blend composition as defined by claim 1, wherein the acrylate polymer comprises an acrylate copolymer formed from greater than 50 percent by weight acrylate monomer.

17. A polymer blend composition as defined by claim 1, comprising:
(a) from about 55 to about 90 percent by weight of an ABS polymer comprising a graft copolymer;
(b) from about 5 to about 25 percent by weight of a copolymer of epichlorohydrin and ethylene oxide; and
(c) from about 5 to about 25 percent by weight polymethylmethacrylate.

* * * * *